(12) United States Patent
    Coventry

(10) Patent No.: US 8,402,691 B2
(45) Date of Patent: Mar. 26, 2013

(54) INSECT TRAP

(75) Inventor: Andrew Coventry, Burleigh Heads (AU)

(73) Assignee: Bantix Worldwide Pty. Ltd., Burleigh Heads (AU)

( * ) Notice: Subject to any disclaimer, the term of this patent is extended or adjusted under 35 U.S.C. 154(b) by 123 days.

(21) Appl. No.: 12/784,655

(22) Filed: May 21, 2010

(65) Prior Publication Data

US 2011/0283597 A1    Nov. 24, 2011

(51) Int. Cl.
    *A01M 1/06*    (2006.01)
(52) U.S. Cl. ............................................. 43/139; 43/107
(58) Field of Classification Search ............... 43/139, 43/113, 112, 107; *A01M 1/02, 1/06, 1/08*
    See application file for complete search history.

(56) References Cited

U.S. PATENT DOCUMENTS

| | | | | |
|---|---|---|---|---|
| 4,332,100 A * | 6/1982 | Schneider | ........................ | 43/113 |
| 5,647,164 A * | 7/1997 | Yates | ............................... | 43/139 |
| 6,088,949 A * | 7/2000 | Nicosia et al. | .................. | 43/107 |
| 6,145,243 A * | 11/2000 | Wigton et al. | ................... | 43/139 |
| 6,199,316 B1 * | 3/2001 | Coventry | ....................... | 43/132.1 |
| 6,655,080 B2 * | 12/2003 | Spiro et al. | ........................ | 43/139 |
| 2003/0208951 A1 * | 11/2003 | Bossler | ............................ | 43/107 |
| 2004/0139648 A1 * | 7/2004 | Durand et al. | ................... | 43/139 |
| 2005/0066570 A1 * | 3/2005 | Mosher et al. | ................... | 43/139 |
| 2006/0218851 A1 * | 10/2006 | Weiss et al. | ...................... | 43/113 |

* cited by examiner

*Primary Examiner* — Darren W Ark
*Assistant Examiner* — Thanh Pham
(74) *Attorney, Agent, or Firm* — William C. Schrot; Jeffrey I. Auerbach; The Auerbach Law Firm, LLC (57) ABSTRACT

The invention resides in an insect trap (10) comprising a housing (14) which has one or more access apertures (19) to permit entry of insects into a hollow interior (19B) of the housing (14) and a catchment tank (20) located below the one or more access apertures (19) for trapping of insects characterized in that there is provided an air diffuser (30) above one or more access apertures (19) and an air blower (37) or fan located adjacent to the air diffuser (30) for generating circulating air within the housing (14). Circulating air is then confined mainly to the housing interior (19B) and does not escape through the access apertures (19).

25 Claims, 12 Drawing Sheets

SECTION A-A
FIG. 8

INSECT TRAP

This invention relates to an insect trap suitable for trapping a variety of biting or flying insects such as flies, mosquitoes, midges, sand flies, blowflies, wasps, hornets and the like. The insect trap of the invention, however, is particularly adapted to trapping mosquitoes.

Reference may be made to U.S. Pat. No. 6,199,316, which describes an insect trap that was particularly directed to the feature of providing a slow release of a compressed gas such as carbon dioxide. This insect trap incorporated a pressure vessel for connection to a supply of the compressed gas and a restrictor tube to provide the slow release of gas into the trap. The insect trap also included a housing defining an insect collection chamber having one or more access apertures to allow an insect to enter the chamber as well as a transparent or translucent prism to which light emitting devices such as an ultraviolet light and a broad spectrum light may be operatively coupled. The broad spectrum light may emit a wide range of different wavelengths. Also light emitting diodes (LEDs) were mounted to each end of the prism, which provided light of the colours red, green and blue as well as white light. Control of the LEDs was provided by a main printed circuit board within the interior of the insect trap. The insect trap also included the use of attractant solutions typically containing lactic acid and octenol located in a solution tray and there was a fan that continuously propelled circulating gas comprising air together with carbon dioxide in conjunction with scent from the attractant solution throughout the housing. Such circulating gas was able to waft to the atmosphere through the access apertures that facilitated the entry of insects into the housing. The scent from the attractant vapours attracted the insects as well as the light being emitted at different wavelengths. There was also a downdraught of circulating air which caused the insects to be driven into the liquid in the solution tray to facilitate entrapment. The above described insect trap was found to be effective in most cases, although it was found in practice that in most cases, the downdraught also escaped through the access apertures and this lead to insects flying away from the trap. It was also found that the use of a fluorescent UV light could only operate at a single frequency and also had to be frequently replaced. The insect trap was also ineffective in windy conditions because such conditions did not facilitate the entry of insects into the trap.

It is therefore an object of the invention to provide an insect trap that may alleviate the above-mentioned disadvantages of the prior art.

The insect trap of the invention in one aspect includes a housing which has one or more access apertures to permit entry of insects into a hollow interior of the housing and a catchment tank located below said one or more access apertures for trapping of insects characterised in that there is provided an air diffuser above said one or more access apertures and an air blower or fan located adjacent the air diffuser for generating circulating air within the housing wherein said circulating air is confined mainly to the hollow interior of the housing and thus does not escape through the access apertures.

In this aspect of the invention the air diffuser may incorporate a plurality of vanes which extend upwardly from a support plate wherein there is provided a pair of end vanes at each end of the fan or air blower as well as plurality of intermediate vanes preferably of curved shape in plan view.

There also may be provided an array of air apertures located in an air screen or lattice adjacent the plurality of intermediate vanes. Such lattice may have a multiplicity of open ended air apertures that are wider in transverse dimension or wider at a top end compared to a bottom end so as to facilitate the production of a venturi effect to provide a suction force adjacent the one or more access apertures to push the insects towards the catchment tank.

The housing may also have a top cover having one or more vent holes to allow circulating air to escape. This facilitates the effect of substantially no air escaping through the access apertures.

In another embodiment of the invention the catchment tank is releasable from the housing and can also incorporate a support frame for capturing a bag for a dry trapping or capture of insects. The catchment tank may also have in some cases a solution of water, which may also contain attractant vapours and carbon dioxide for a wet capture of insects. The catchment tank may also incorporate a layer of sticky paper or material also for dry capture of insects.

In another embodiment of the invention there may be provided an air heater suitably comprising a lattice work or screen of conductors which may be heated by electrical resistance heating which may be of contrasting colours such as black and white to further enhance capture of insects. The conductors may be housed in a transparent covering or lens made from plastics material.

The air heater screen may also have attached thereto a plurality of LEDs which may emit light of differing wavelengths. Preferably such emission is carried out in pulses and this may be controlled by an appropriate printed circuit board. Such LEDs can be controlled as may be required at varying wavelengths.

The housing therefore may comprise a top compartment containing the air diffuser as described above and the air heater and LEDs supported on a chassis component located below the air diffuser. There also may be side passages for provision of a continuous flow of circulating air. The catchment tank may be located below the chassis component.

The housing may also have a pair of side casings which are hollow having one or more access openings. One side casing may contain attractant solution and the other side compartment may contain a catalytic converter assembly for conversion of propane or other suitable alkane to carbon dioxide.

Reference may be made to a preferred embodiment of the invention shown in the accompanying drawings wherein.

PREFERRED EMBODIMENTS OF THE INVENTION

Figure 1:
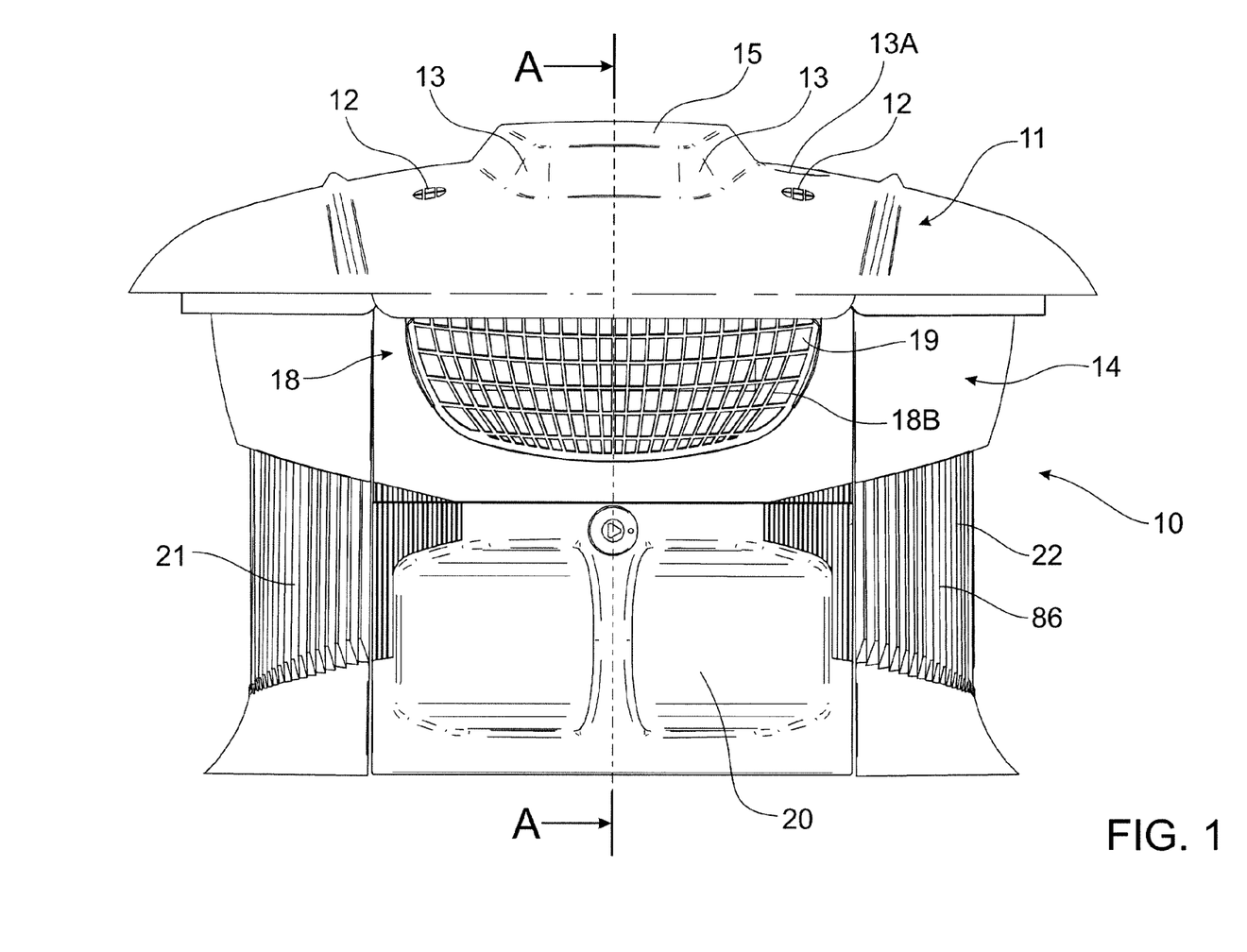
FIG. 1 is a front view of an insect trap of the present invention.

FIG. 1 shows insect trap 10 having top cover 11, raised boss 15 having attachment sockets 13 in each corner, air vents 12, top access aperture 13A for passing water into catchment tank 20, side compartment 21 for containing an attractant lure container shown hereinafter in FIG. 12, side compartment 22 for containing a catalytic converter described hereinafter in FIGS. 5-6 and body or housing 14 which supports top cover 11. There is also shown access apertures 19 located between ribs 18B of grille 18 to permit entry of insects into interior 19B of housing 14.

Figure 2:
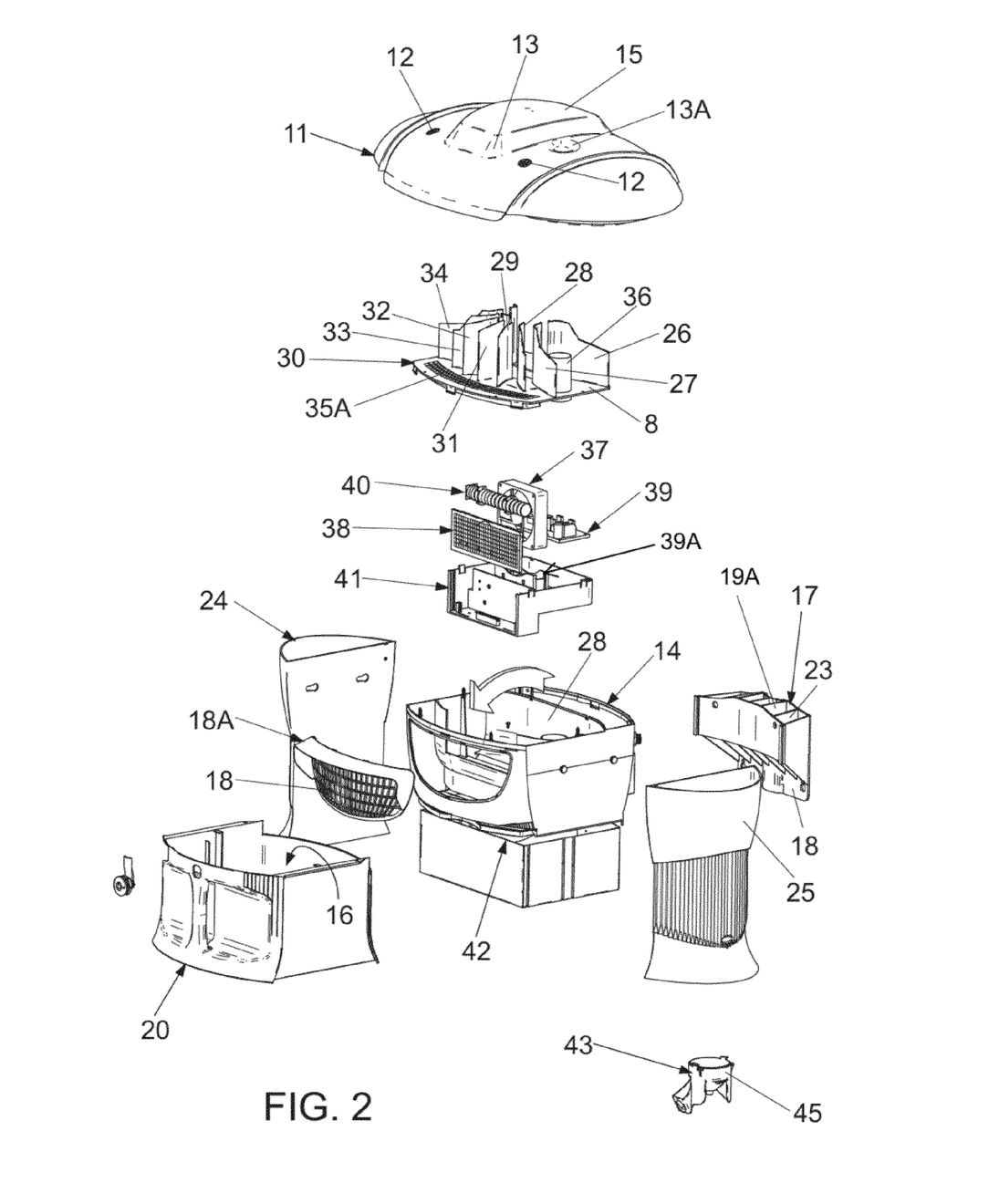
FIG. 2 is an exploded perspective view of the insect trap shown in FIG. 1.

FIG. 2 shows wall mount 17 having depending flange 18 for mounting to a supporting hook or abutment on a wall or pole (not shown) as well as spaced ribs 19A and passages 23 between ribs 19. There is also shown casing 24 constituting side compartment 21, casing 25 constituting side compartment 22, catchment tank 20 having interior 16 which is separate from body 14, air diffuser 30 having vanes 26, 27, 28, 29, 31, 32, 33, 34 and 35 mounted on support plate 8 better illustrated hereinafter in FIG. 7, air screen or baffle 35A, water tube 36 which communicates with top access aperture 13A and catchment tank 20, fan 37, air heater 38, main printed circuit board 39, lens/light prism 40 and chassis component 41 for supporting heater 38, fan 37, prism 40 and circuit board 39. Body 14 also has base 42. Chasis componet 41 has a recess 39A for supporting fan 37. There is also shown catalytic converter 43 which has hollow support bracket 45 and other components described in detail in FIGS. 5-6.

Figure 3:
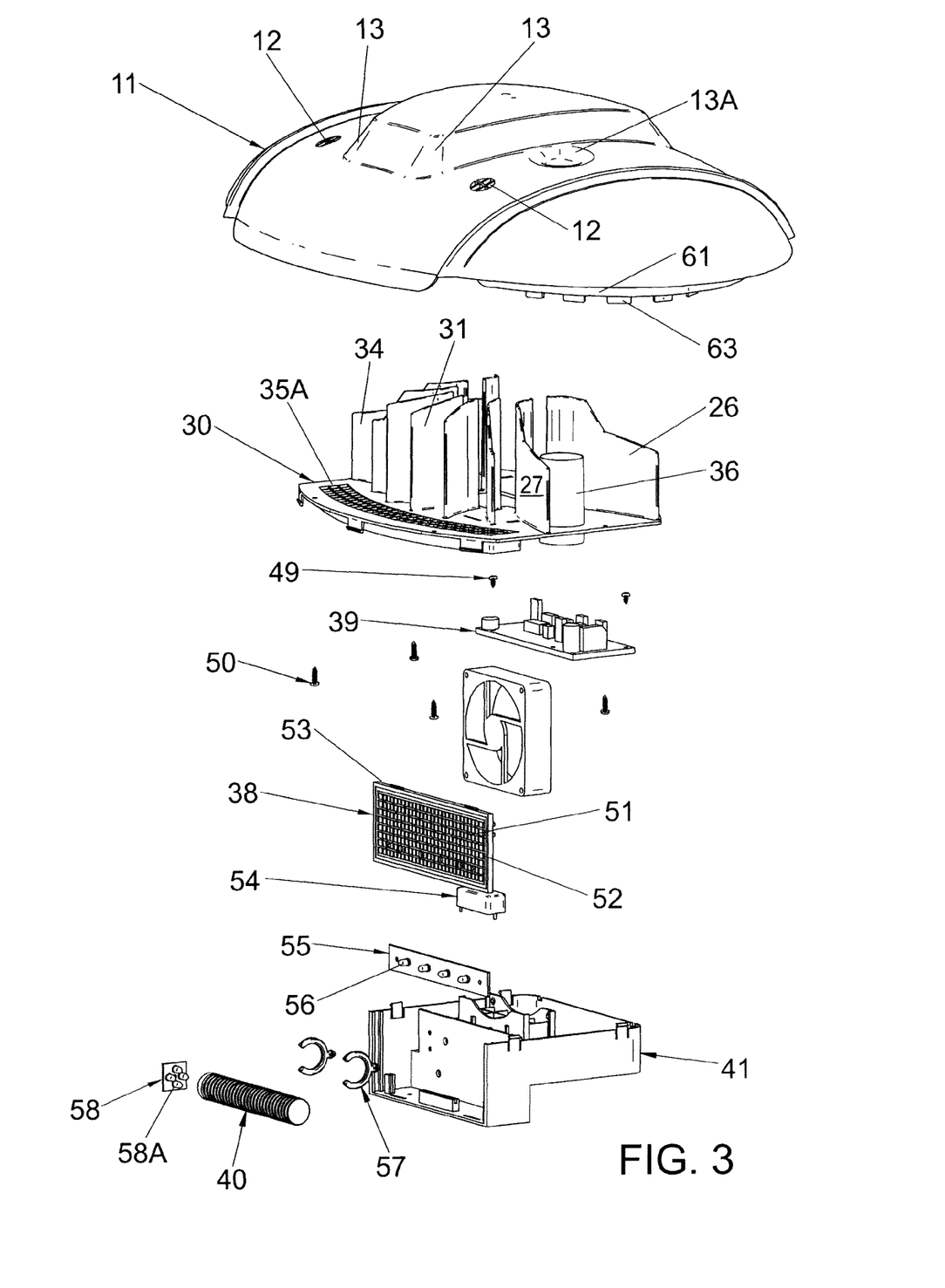
FIG. 3 is a similar view to FIG. 2 showing components of an upper part of the insect trap in greater detail.

In FIG. 3 there is shown main printed circuit board 39 having attachment screws 49 for attachment to chassis component 41 and screws 50 which engage with sockets 13 of top cover 11. Heater 38 is shown as having vertical conductors 51 and horizontal conductors 52 mounted in a plastics casing or lens 53. Ioniser 54 and printed circuit board 55 are also shown for LEDs 56, as well as UV light. There is also shown clips 57 for prism 40 as well as printed circuit board 58 for coloured LEDs 58A.

Figure 4:
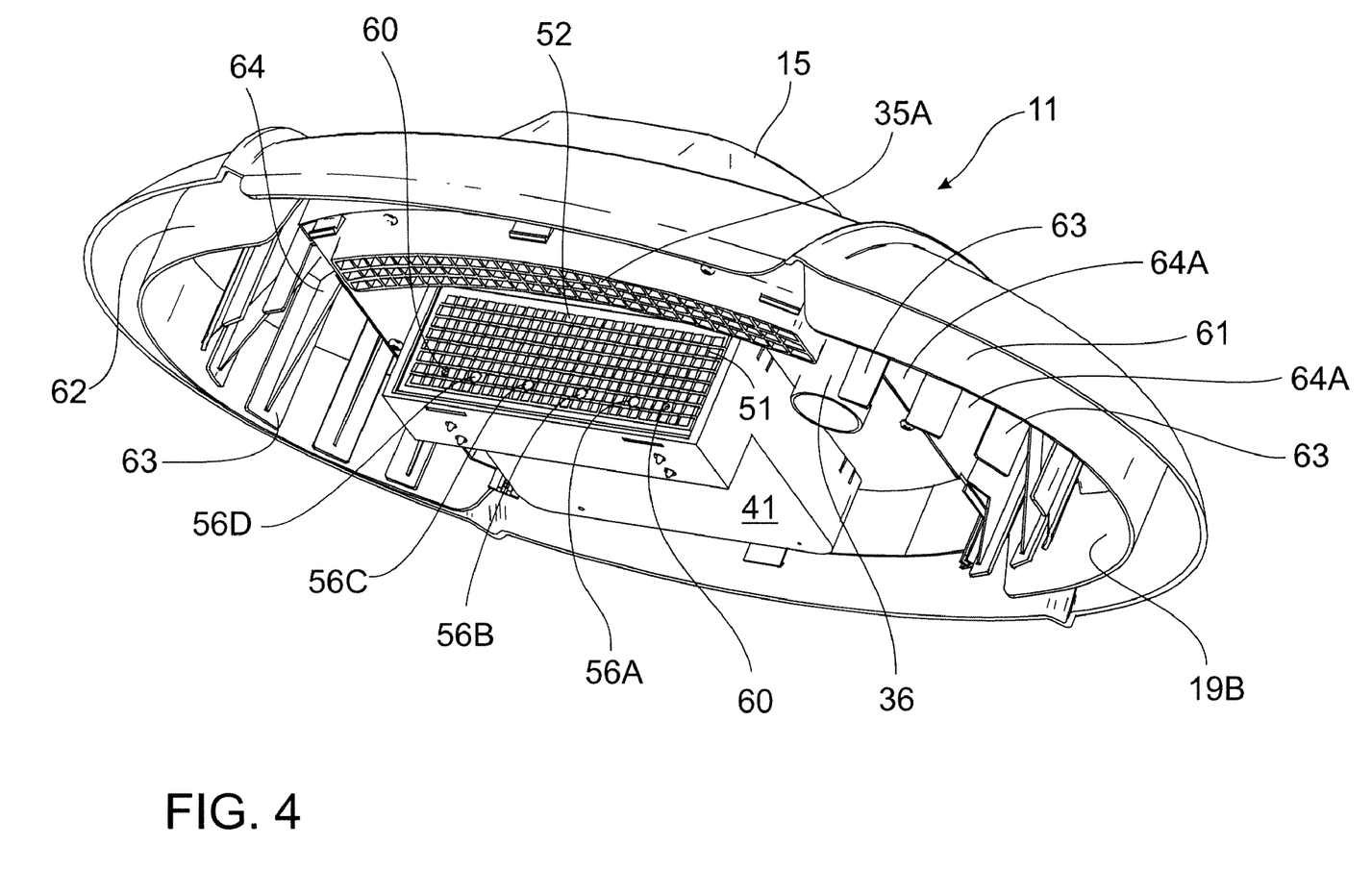
FIG. 4 is a perspective view showing an assembly of the components shown in FIG. 3.

In FIG. 4, there is shown the underside of top cover 11 showing arcuate air deflectors 61 and 62 at each end of the top cover 11 as well as rectangular baffles 63 to reduce the turbulent flow of air within the interior 19B. Each baffle 63 has a reinforcing web 64. There is also provided spaces 64A to allow attractant vapours and carbon dioxide to vent to atmosphere. There is also shown fasteners 60 attaching air heater 38 to chassis component 41. LEDs 56A, 56B, 56C and 56D are also shown.

Figure 5:
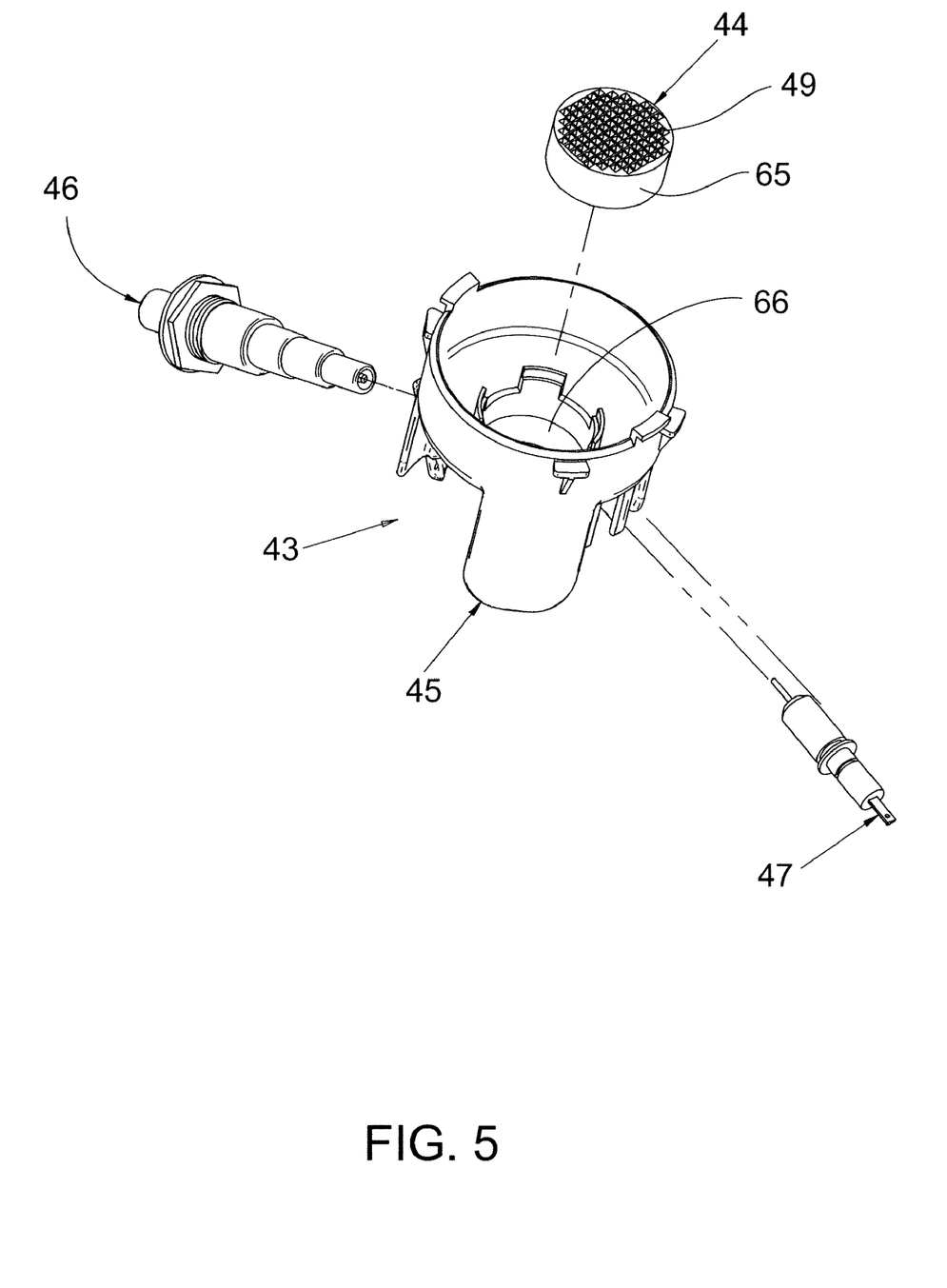
FIG. 5 shows an exploded view of the components of the catalytic converter assembly.

FIG. 5 shows the catalytic converter assembly 43 having hollow support bracket 45, piezo starter head unit 46, spark end 47 and wafer or biscuit 44 which has a ceramic 49 supporting suitable catalysts which may be dehydrogenation catalysts such as Group VIII metals inclusive of platinum, palladium or silver, which produce propane that then reacts with oxygen during combustion to produce carbon dioxide. The ceramic 49 is supported in a plastics casing 65 that incorporates a conductive carbon content to avoid use of an earth wire.

Figure 6:
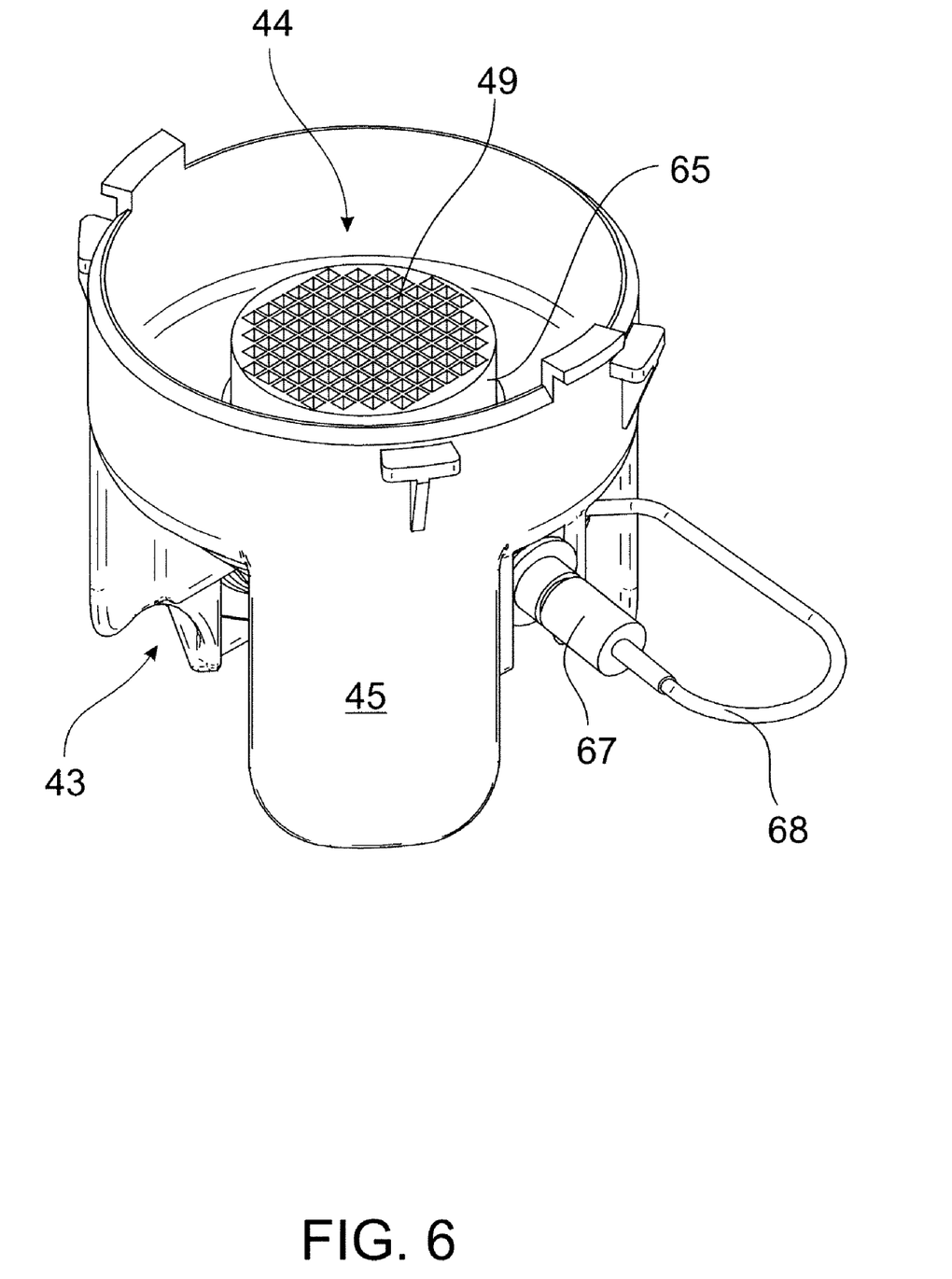
FIG. 6 is a perspective view of an assembly of the components shown in FIG. 5.

In FIG. 6 there is also shown the assembled catalytic converter 43 and wafer or biscuit 44 located in base aperture 66 shown in FIG. 5. There is also provided a gas inlet 67 having connected thereto a gas tube 68. The function, therefore, of catalytic converter 43 is to convert propane which is supplied through gas tube 68 to wafer 44 through the action of catalysts as described above to produce carbon dioxide caused by the combustion of propane by the spark in the piezo electric starter 46.

Figure 7:
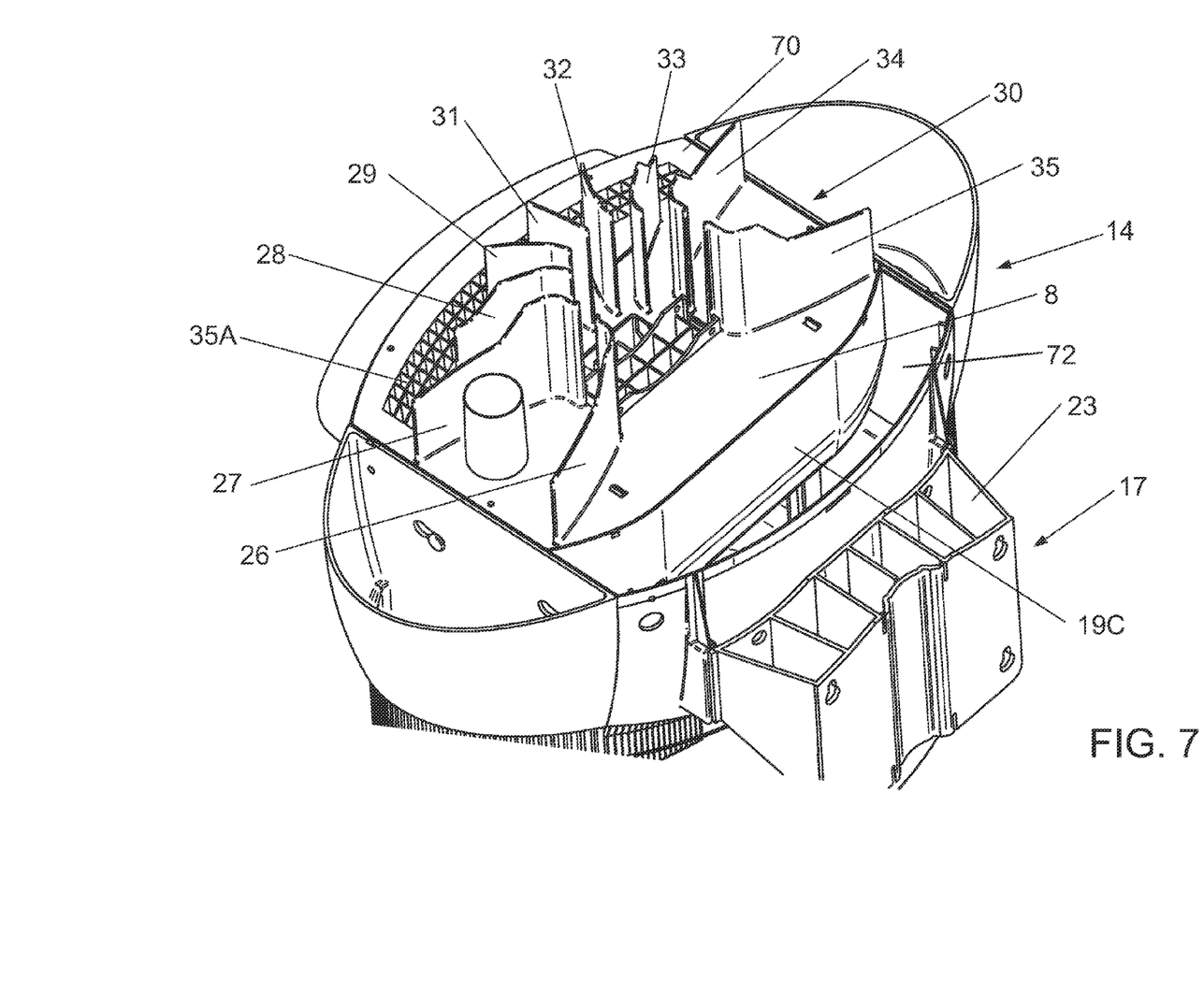
FIG. 7 is an upper perspective view showing the air diffuser.

In FIG. 7, there is shown the arrangement of vanes 26, 27, 28, 29, 31, 32, 33, 34 and 35 of air diffuser 30 as well as mounting bracket 70 for fan 37. There is also shown upstanding wall and 19C between end vane 26 and 35.

Figure 8:
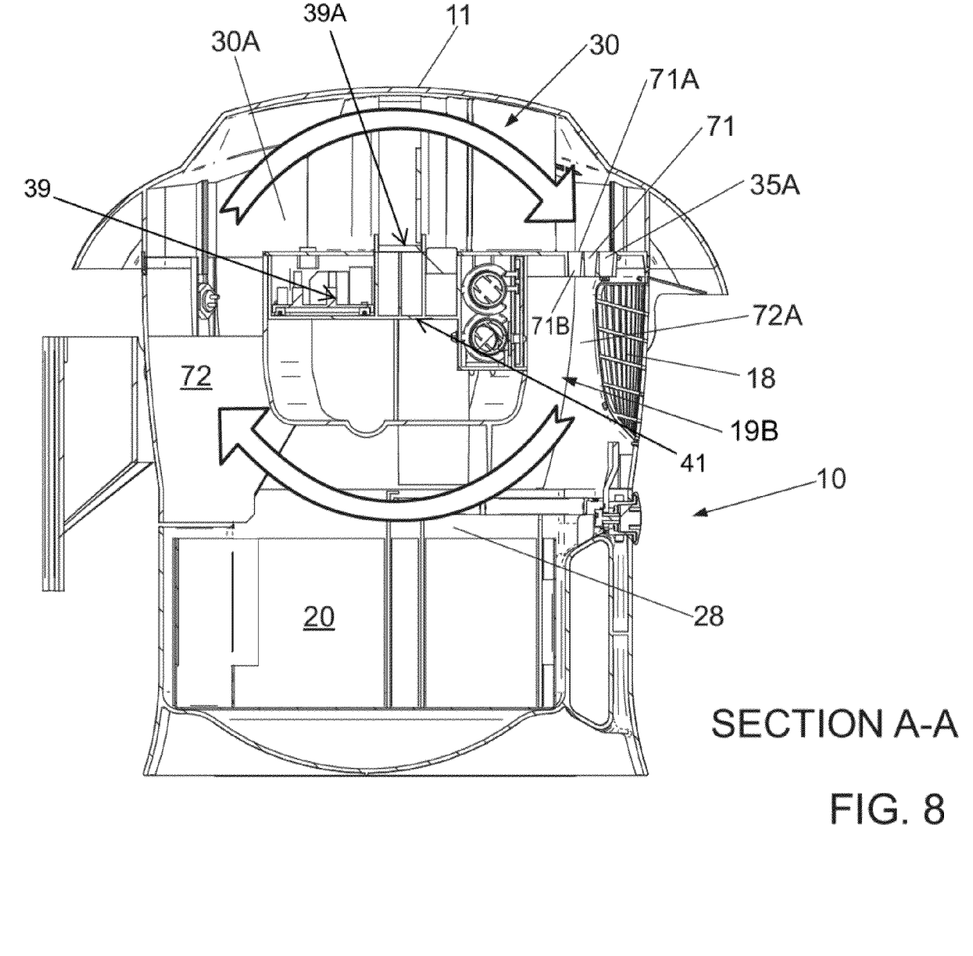
FIG. 8 is a front sectional view through line A-A of FIG. 1 showing the continuous flow of air throughout the housing.

FIG. 8 shows the circulation of air within insect trap 10 and this is a continuous flow of air as shown by the arrows in bold. A high pressure jet of air is generated by fan 37 and the pressure and the velocity of this air stream is increased by vanes 26-35 of air diffuser 30 so that the jet stream is kept totally within hollow interior 19B of chassis 14 so that no air is caused to be expelled through grille 18. Thus, in other words, there is no pressure differential inside and outside of grille 18 as the pressure is maintained essentially at atmospheric pressure. If air was caused to be expelled through grille 18 this would only result in the insects flying away from grille 18. The velocity and pressure of the air as it enters the bottom compartment 28 of chassis 14 is increased by the air travelling through air baffle 35A which increases the velocity and pressure of the air by the establishment of a venturi effect. In this regard, air baffle 35A is provided with passages 71 which exacerbate this venturi effect having a wider top end 71A and a narrower bottom end 71B. As shown in FIG. 8 air after leaving air diffuser compartment or top plenum chamber 30A and after travelling through air baffle or screen 35A reaches bottom compartment 28 above catchment tank 20 and this causes insects after entering hollow interior 19B of trap 10 to fall into catchment tank 20. The air then leaves bottom compartment 28 and travels to air diffuser 30 through side passage 72. Air also travels through side passage 72A after leaving air baffle 35A.

Figure 9:
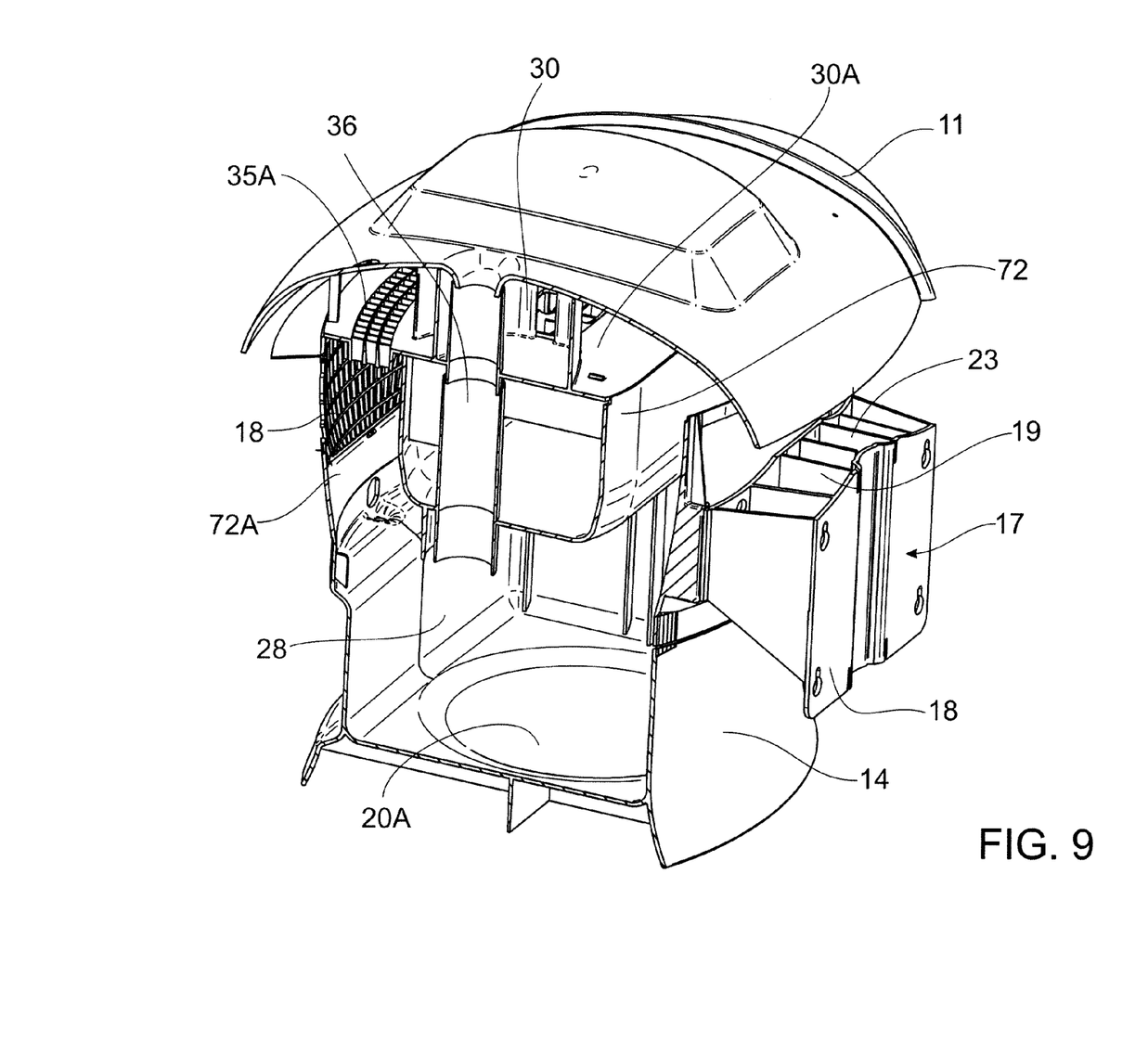
FIG. 9 is a perspective cut away view of the insect trap with the catchment tank removed.

FIG. 9 shows a view of chassis 14 of insect trap 10 with catchment tank 20 removed for clarity. It shows bottom compartment 28 for supporting catchment tank 20 as well as drainage recess 20A.

Figure 10:
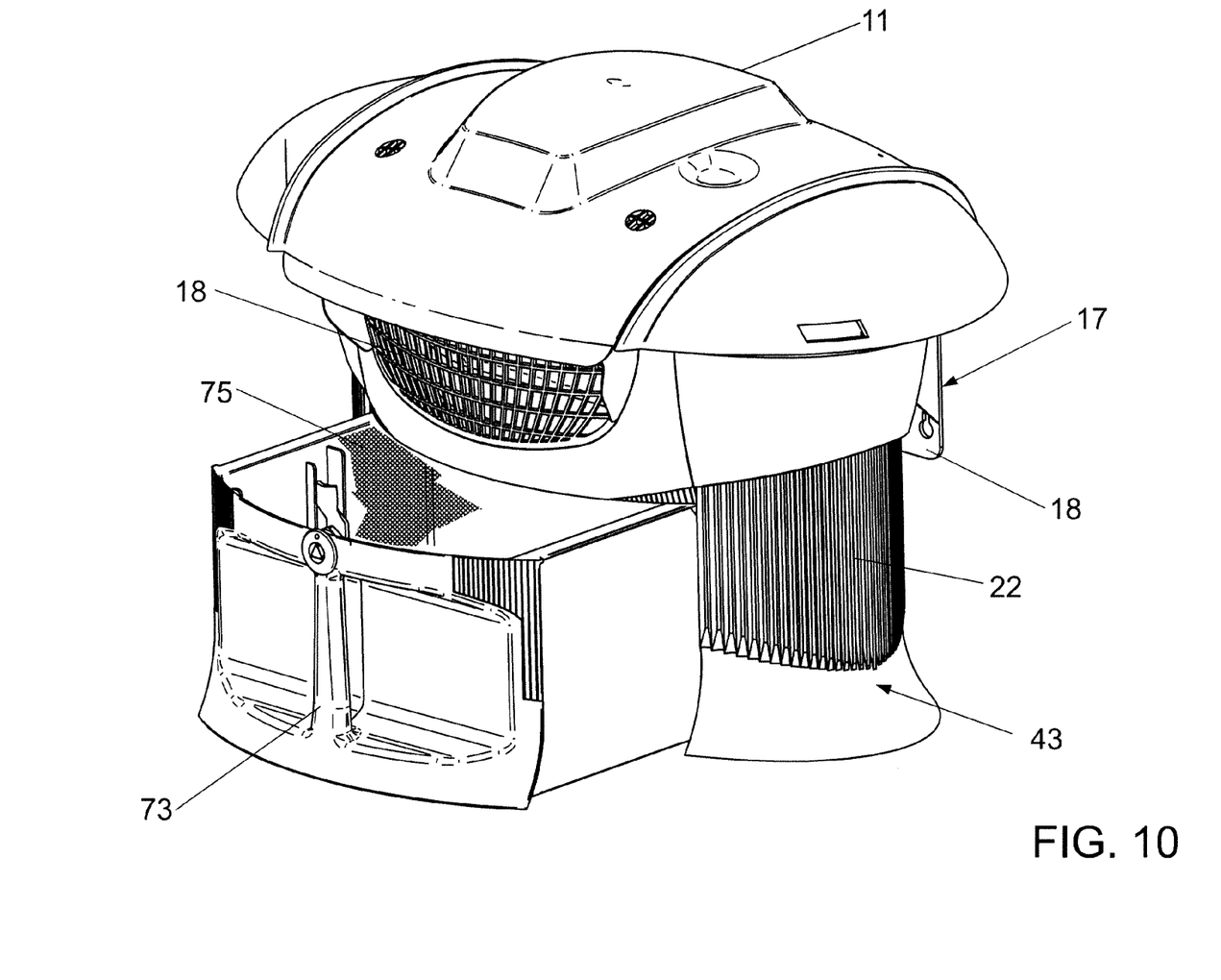
FIG. 10 is a perspective view of the insect trap of FIG. 1 showing partial removal of the catchment tank.

FIG. 10 shows the catchment tank 20 partially removed from bottom compartment 28 for clarity. The catchment tank 20 has handle 73 as well as a support frame 74 for supporting a mesh bag 75 only shown partly for convenience, so that insects may be caught in mesh bag 75 without it being necessary for catchment tank 20 to contain water.

Figure 11:
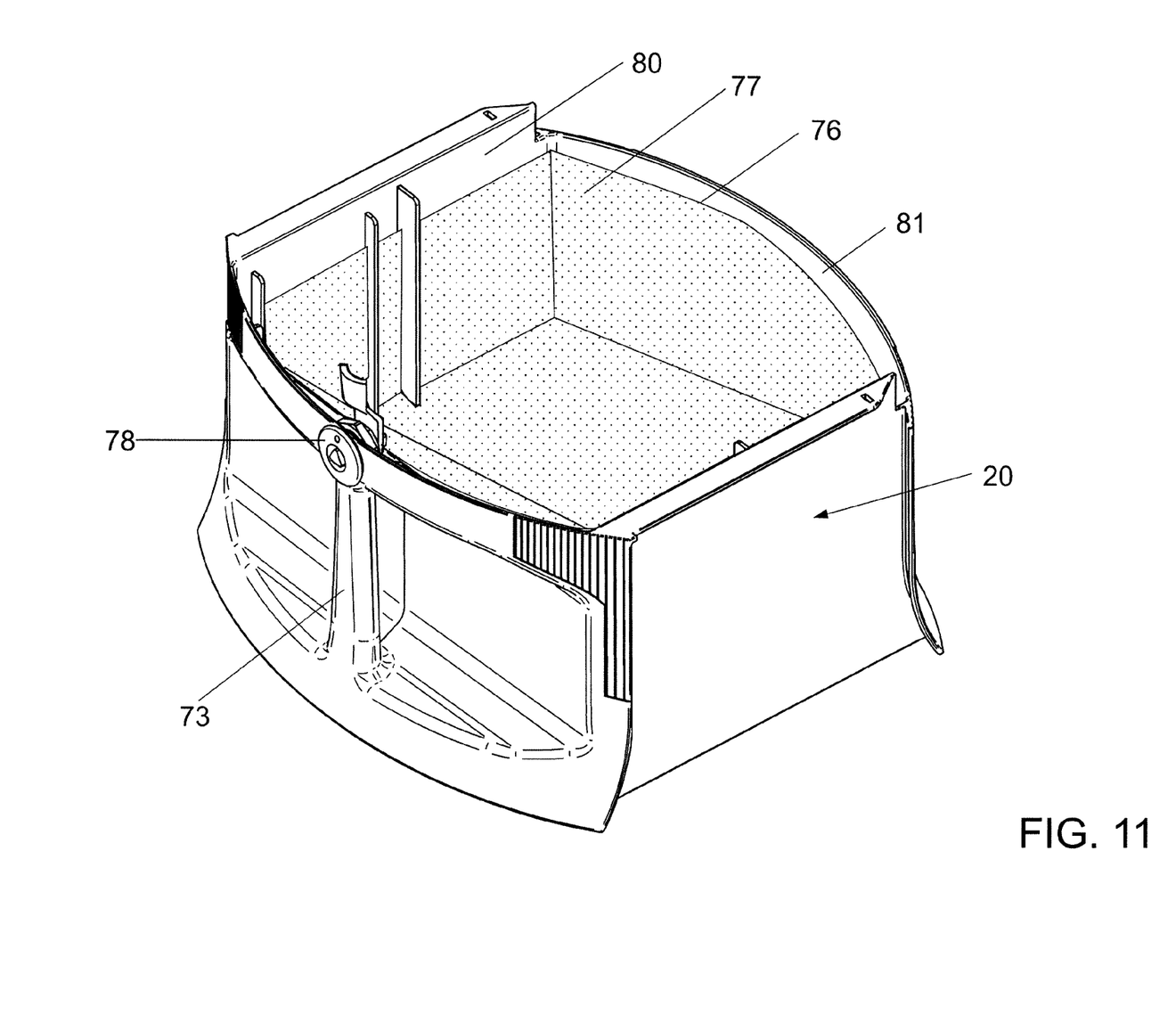
FIG. 11 shows a perspective view of the catchment tank supporting a layer of sticky material.

Another option is shown in FIG. 11, wherein catchment tank 20 is lined with sticky paper 76 so that insects may be caught on an adhesive patch 77, again only shown partly for convenience. Again in this embodiment, catchment tank 20 does not require to be filled with water. Catchment tank 20 may also be provided with a key operated lock 78. Catchment tank 20 has opposed side walls 79 and 80, rear wall 81 and front wall 82 all of which may be lined with sticky paper 76.

Figure 12:
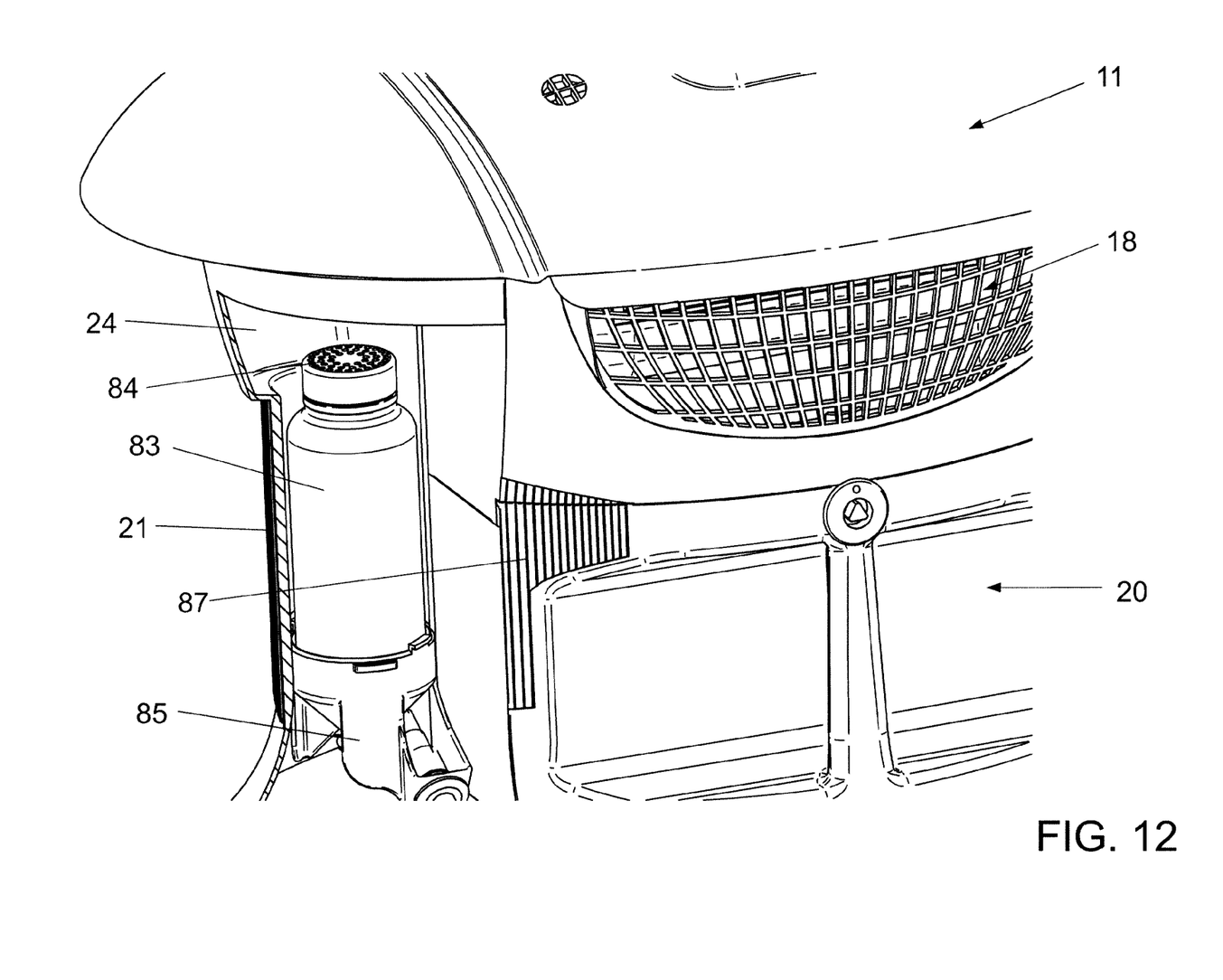
FIG. 12 is a detailed view of the side compartment of the housing having a container of attractant liquid.

FIG. 12 shows a container 83 containing a lure formulation. Container 83 has cap 84 and is supported by clip 85 in compartment 21. It will be appreciated that the lure formulation may contain chemicals inclusive of known insect attractants such as lactic acid and octenol. Lactic acid as explained in U.S. Pat. No. 6,199,316 is present in human sweat and is considered to be an attractant, especially for mosquitoes. Octenol is believed to be an attractant for both mosquitoes and flies. The scent or odour of lactic acid, octenol and carbon dioxide is able to waft through grille 18 into the atmosphere and thus, attract the flying insects. However, the concentration of the attractant and the carbon dioxide is greatest within compartment 28. Thus, insects will be attracted to enter compartment 28 by the attraction of carbon dioxide from compartment 22 and carbon dioxide may also be released into the atmosphere surrounding trap 10 through slots 86 shown in FIG. 1. Attractants in vapour form may also be released into the atmosphere from compartment 21 through slots 87, shown in FIG. 12.

As the insects enter compartment 28 they will then be caught by the down draft of air shown in FIG. 8, which is kept totally within compartment 28 as explained above. Thus, they will not be distracted by air flowing from grille 18 as is the case of the trap shown in U.S. Pat. No. 6,199,316. They will then be attracted by air heater 38 comprising conductors 51 and 52 encased in housing or lens 53 made from clear or transparent plastics material. This creates a visible target of black and white stripes, which will assist in attracting the insects. The two outer LEDs 56A and 56D operate on a frequency of between 360-390 nanometre (nm) and the two inner LEDs 56B and 56C operate on a frequency of 320-360 nm. The time of operation for the LEDs can range from 20,000 hours to 100,000 hours. The LEDs are frequently pulsed and are considered to be a substantial improvement over the fluorescent light system shown in U.S. Pat. No. 6,199,316, which after three months may be burnt out. The fluorescent lights can only operate at 100% efficiency in the first month. The printed circuit boards used for creating the current in conductors 51 and 52 by resistance heating may be 12 volt AC or DC and can be based on the PCBs shown in U.S. Pat. No. 6,199,316. Thus, such a PCB can be used for operation of colour prism 40 and coloured LEDs 58, which are described in U.S. Pat. No. 6,199,316, which is entirely incorporated herein by reference. Coloured LEDs 58 may also be pulsed if required.

It will also be appreciated that the fluorescent light system shown in U.S. Pat. No. 6,199,316 can only be operated on a single frequency which is usually around 330 nm.

It will also be appreciated that carbon dioxide can be released from compartment 21 using a simple gas release system having a timer or clock control. This can also be controlled by a PCB if desired.

Another feature of the invention is the ability of the PCB to produce a sound which mimics the sound of a feeding frenzy of mosquitoes or other biting insects. This feature also attracts mosquitoes through the grille 18.

It will also be appreciated that a catalytic converter assembly 43 may be dispensed with and insect trap directly connected to a cylinder of compressed carbon dioxide.

The air trap 10 may also be operated through mains, solar or battery power.

It is also pointed out that insect trap 10 is specifically designed to attract female mosquitoes which bite and spread disease. By targeting the females when they are seeking a blood meal they are being eliminated before they cause infection.

It is also emphasised with the production of air heater 38 that the air trap of the invention simulates the natural behaviour and environment of mosquitoes. The attraction of heater 38 to the mosquitoes is also facilitated by LEDs randomly pulsing selected colours of light and the pattern of light action causes illusion of movement. The heating effect also simulates human body heat.

The invention claimed is:

1. An insect trap comprising:
a housing which has one or more access apertures to permit entry of insects into a hollow interior of said housing and a bottom compartment containing a catchment tank located below said one or more access apertures for trapping insects;
an air diffuser above said one or more access apertures, said air diffuser including front vanes and rear vanes supported by a support plate; and
an air blower or fan located on said support plate and disposed between said front vanes and said rear vanes, wherein said air diffuser and said air blower or fan generate a continuous flow of air for circulation through said hollow interior of said housing, wherein said front vanes diverge away from said air blower or fan and relative to air flow direction and said rear vanes converge toward said air blower or fan and relative to the air flow direction, and wherein the continuous flow of air generated by said air diffuser and said air blower or fan flows toward said bottom compartment above said catchment tank, thereby pushing insects entering said hollow interior through said one or more access apertures downwardly and into said catchment tank.

2. The insect trap of claim 1, wherein a majority of said front vanes have an at least partly curved or angled shape in plan view.

3. The insect trap of claim 2, wherein there is provided an array of air apertures located in an air screen or lattice adjacent to said front vanes, wherein said air screen or lattice is part of said support plate.

4. The insect trap of claim 3, wherein the array of air apertures located in the air screen or lattice has a multiplicity of open ended air apertures that are wider in transverse dimension or wider at a top end compared to a bottom end so as to facilitate the production of a venturi effect to provide a suction force adjacent to the one or more access apertures to push the insects towards the catchment tank.

5. The insect trap of claim 4, wherein the housing further comprises a top cover having one or more vent holes to allow circulating air to escape.

6. The insect trap of claim 4, wherein the catchment tank is releasable from the housing.

7. The insect trap of claim 6, wherein the catchment tank comprises a support frame for capturing a bag for a dry trapping or capture of insects.

8. The insect trap of claim 1, incorporating an air heater comprising a lattice work or screen of conductors which are heated to further enhance capture of insects.

9. The insect trap of claim 8, wherein the conductors are located by electrical resistance heating.

10. The insect trap of claim 8, wherein the conductors are of contrasting colors.

11. The insect trap of claim 8, wherein the conductors are housed in a transparent covering or lens made from plastics material.

12. The insect trap of claim 8, wherein the air heater has a plurality of LEDS which emit light of differing wavelengths.

13. The insect trap of claim 12, wherein emission of the light is carried out in pulses controlled by a circuit board.

14. The insect trap of claim 1, wherein the housing has one side casing which is hollow and having one or more access apertures, which contains insect attractant solution.

15. The insect trap of claim 14, wherein the housing has another side casing containing a catalytic converter assembly for conversion of propane or other suitable alkane to carbon dioxide.

16. The insect trap of claim 10, wherein said contrasting colors of said conductors are black and white.

17. The insect trap of claim 8, wherein said air heater is located below said air diffuser and supported by a chassis component which also carries said air blower or fan.

18. The insect trap of claim 17, wherein said catchment tank is located below said chassis component.

19. The insect trap of claim 2, wherein each one of said rear vanes comprises an elongate upstanding wall that defines a gap between said upstanding wall and said housing for movement of the flow of air.

20. An insect trap including:

a housing having one or more access apertures to permit entry of insects into a hollow interior of said housing, and a bottom compartment containing a catchment tank located below said one or more access apertures for trapping insects;

an air diffuser including a plurality of vanes which are vertically oriented and have at least a partly curved or angled shape in plan view, wherein each one of said plurality of vanes is supported by a common support plate, said air diffuser being located above said one or more access apertures; and an air blower or fan located on said common support plate and located adjacent respective inner ends of each of said plurality of vanes, wherein said air blower or fan and said air diffuser are responsible for generating a continuous flow of air for circulation mainly through said hollow interior of said housing, wherein said plurality of vanes includes front vanes diverging away from said air blower or fan and relative to air flow direction and rear vanes converging toward said air blower or fan and relative to the air flow direction, said air blower or fan disposed between said front vanes and said rear vanes, and wherein the continuous flow of air flows through a side passage of said hollow interior and then through said bottom compartment above the catchment tank to cause insects entering said hollow interior of said housing through said one or more access apertures to be deposited in the catchment tank.

21. The insect trap of claim 20, wherein an opposite side passage in said hollow interior is separated from said side passage by a chassis component coupled to said air blower or fan.

22. The insect trap of claim 20, further comprising a cover having arcuate air deflectors at opposing ends thereof, said arcuate air deflectors for reducing turbulence of the continuous flow of air in said hollow interior.

23. The insect trap of claim 1, wherein said continuous flow of air is confined mainly to said hollow interior, and said continuous flow of air generated by said air diffuser and said air blower or fan flows directly adjacent and in fluid communication with said access apertures toward said bottom compartment.

24. The insect trap of claim 20, wherein said housing includes a top cover defining a plurality of air vents.

25. The insect trap of claim 20, wherein said continuous flow of air flows downwardly from said air blower or fan through said side passage, said side passage being in fluid communication with said access apertures.

* * * * *